United States Patent
Parapadakis (10) Patent No.: US 12,217,081 B2
(45) Date of Patent: Feb. 4, 2025

(54) DECENTRALIZED PROCESS MANAGEMENT USING DISTRIBUTED LEDGERS

(71) Applicant: Hyland UK Operations Limited, Maidenhead (GB)

(72) Inventor: George Parapadakis, Milton Keynes (GB)

(73) Assignee: Hyland UK Operations Limited (GB)

( * ) Notice: Subject to any disclaimer, the term of this patent is extended or adjusted under 35 U.S.C. 154(b) by 123 days.

(21) Appl. No.: 16/275,872

(22) Filed: Feb. 14, 2019

(65) Prior Publication Data
US 2020/0264915 A1    Aug. 20, 2020

(51) Int. Cl.
*G06F 9/46* (2006.01)
*G06F 8/60* (2018.01)
*G06F 9/30* (2018.01)
*G06F 9/52* (2006.01)

(52) U.S. Cl.
CPC ............ *G06F 9/463* (2013.01); *G06F 9/3005* (2013.01); *G06F 9/52* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 2015/0379510 A1* | 12/2015 | Smith | .................... | H04L 9/3242 705/71 |
| 2016/0261685 A1* | 9/2016 | Chen | ................. | H04W 12/0023 |
| 2017/0039330 A1* | 2/2017 | Tanner, Jr. | ............ | G06F 19/328 |
| 2017/0279783 A1* | 9/2017 | Milazzo | ................... | B29C 64/00 |
| 2019/0268277 A1* | 8/2019 | Asthana | .................. | H04L 67/10 |
| 2019/0392164 A1* | 12/2019 | Dutta | .................... | H04L 9/0825 |
| 2019/0392392 A1* | 12/2019 | Elden | .................... | H04L 9/3239 |
| 2020/0012779 A1* | 1/2020 | Chandrasekaran | ..... | G06F 21/64 |
| 2020/0021590 A1* | 1/2020 | Jeuk | ..................... | H04L 63/0892 |
| 2020/0042960 A1* | 2/2020 | Cook | ................ | G06Q 20/3829 |
| 2020/0127843 A1* | 4/2020 | Webster | ................ | H04L 63/102 |
| 2020/0183917 A1* | 6/2020 | Duchastel | ........... | G06F 16/2379 |

FOREIGN PATENT DOCUMENTS

WO    WO-2017136956 A1 *    8/2017    ............. G06F 16/27

OTHER PUBLICATIONS

Billings, J. J., "Applying Distributed Ledgers to Manage Workflow Provenance", arXiv: 1804.05395 [cs.DC], Apr. 15, 2018. (Year: 2018).*

Xu, X. et al., "The Blockchain as a Software Connector", 2016 13th Working IEEE/IFIP Conference on Software Architecture. (Year: 2016).*

* cited by examiner

*Primary Examiner* — Clay C Lee
(74) *Attorney, Agent, or Firm* — Eschweiler & Potashnik, LLC (57) ABSTRACT

Computer-implemented methods, systems and infrastructure for depositing at least one instruction onto one or more data blocks of a distributed immutable ledger implemented to have a plurality of data blocks connected by way of logical links in a sequential chain. The at least one instruction may be associated with information deposited onto the one or more data blocks, the deposited information comprising at least one of data or metadata utilizable by a second party, using a computing application, to perform one or more operations according to the at least one instructions as related to a first step in a process being managed by the first party.

20 Claims, 5 Drawing Sheets

DECENTRALIZED PROCESS MANAGEMENT USING DISTRIBUTED LEDGERS

TECHNICAL FIELD

The disclosed subject matter generally relates to computer-implemented workflow management technology and, more particularly, to a decentralized process management system implemented using distributed ledgers.

BACKGROUND

Many organizations rely on centrally managed control mechanisms to provide access to locally or remotely provisioned computing resources, such as on-site server systems or cloud-based software as a service (SaaS) platforms. Access control management systems that are centrally controlled restrict workflow automation and business process management, especially when an organization is required to manage every step of the process for multiple independent parties or vendors that are responsible for different parts of the process.

Restrictions in workflow often slow down the operational speed and increase processing costs, due to the need to provision, operate and support the underlying infrastructure and also because of the overhead and inefficiencies associated with active human supervision or delays in access to resources. Such factors are particularly burdensome when organizational or geographical boundaries result in inconsistencies in workflow infrastructure and protocols. Improvements are needed that enable seamless process flow management, without the need for rigid centralized control and governance.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, a computer-implemented method is provided. The method comprises depositing, by a first party using a first process engine, at least one instruction onto one or more data blocks of a distributed immutable ledger implemented to have a plurality of data blocks connected by way of logical links in a sequential chain, the at least one instruction being associated with information deposited onto the one or more data blocks, the deposited information comprising at least one of data or metadata utilizable by a second party, using a computing application, to perform one or more operations according to the at least one instructions as related to a first step in a process being managed by the first party.

In example embodiments, one or more results deposited onto the one or more blocks of the distributed immutable ledger may be read, the one or more results having been generated by the second party according to the at least one instruction deposited by the first party; and utilizing, by the first party, at least a portion of the one or more results deposited by the second party to confirm that one or more processes associated with the deposited information are performed by the second party according to the at least one instruction.

The second party utilizes a second process engine compatible with the first process engine to monitor a first data block of the distributed immutable ledger for the at least one instruction; perform the one or more operations according to the at least one instruction in order to advance the process being managed by the first party to a second step in the process; and deposit the one or more results on a second data block monitored by the first process engine. One or more of the first process engine and the second process engine may be deployed as a smart contract on the distributed immutable ledger to orchestrate the execution of process flow and data exchanges between the first party and the second party.

In one implementation, one or more records are maintained on the distributed immutable ledger, the one or more records comprising: the at least one instruction, the deposited information by the first party, and the deposited results by the second party. The deposited information by the first party are stored on a first block on the distributed immutable ledger such that the first block is monitored by the second party. The one or more results deposited by the second party are stored on a second block on the distributed immutable ledger such that the second block is monitored by the first party. The metadata identifies a state of the one or more processes associated with the deposited information to enable the first party and the second party determine progress in workflow associated with the one or more processes.

The metadata may enable the first party and the second party utilize the distributed immutable ledger as a distributed environment in which the workflow is manageable between two or more parties according to state information communicated between the two or more parties. In one aspect, the metadata enables the first party and the second party synchronize the work flow associated with the one or more processes. The first process engine may be utilized by the first entity, wherein one or more records are maintained on the distributed immutable ledger, the one or more records comprising: the at least one instruction, the deposited information by the first party, and the deposited results by the second party.

In some variation of example embodiments, the deposited information by the first party may be stored on a first data block on the distributed immutable ledger by the first process engine, the first data block being monitored by the second party. The one or more results deposited by the second party may be stored on a second data block on the distributed immutable ledger such that the second data block is monitored by the first process engine.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with some implementations, a distributed process management system is provided in which an organization or entity may delegate the responsibility for performing parts of a process or workflow to one or more other entities. Multiple parties may be identified to take control of different parts of the process and interact seamlessly, unencumbered by organisational or geographical boundaries or by the need to provision a common infrastructure using a centrally managed access control mechanism.

As provided in further detail herein, in some embodiments, a consistent audit trail of activities may be maintained by way of using a distributed ledger. A distributed ledger may be implemented as a publicly accessible message queue with an immutable database. Examples of computing platforms that may be used to implement a distributed ledger may include a blockchain, a hashgraph, or other computing data structures implemented based on a growing list of N associated records or data blocks.

In accordance with one or more aspects, a data block may be logically linked to another block (e.g., a previous block) in the distributed ledger based on a cryptographic hash of the content of the other block. A data block may also include a timestamp or transaction data. Further, a data block in a distributed ledger may be implemented to be immutable (i.e., resistant to modification of the data stored within the block). The immutable nature of the data block and the acceptance of a set of rules and policies by the users (or the implementers) of the distributed ledger platform provides for high levels of confidence in the data stored and processed by the distributed ledger because a singular central entity is not solely in control.

One or more distributed ledgers may be implemented to include or interface with smart contracts in the form of computing engines. A smart contract may be a digital promise entailing rights and duties voluntarily agreed by the parties to a contract configured to digitally facilitate, verify, or enforce the negotiation or performance of an agreement between the parties. In one embodiment, the smart contract may be implemented based on a combination of protocols with user interfaces to formalize and secure relationships over computer networks, using cryptographic and other security mechanisms.

In accordance with one or more embodiments, a smart contract may be utilized to, for example, allow the performance of credible (i.e., trackable and irreversible) transactions without involving a centralized managing party. The transactions may be processed by serverless microservice engines (e.g., Lambdas or other decentralized infrastructure) on a distributed ledger platform. To enable financial transactions, in certain variations, tokens (e.g., personal trading units) may be utilized to monetize digital transactions without the need for a centralized institution (e.g., a bank).

Referring to FIGS. 1 through 4, the control of a process and the flow of the relevant process data may be securely extended and delegated to third parties, using distributed ledgers, without the need for access to a common or centralized system or explicit authentication. As a result, traditional process optimization, automation and decision making may be extended, beyond the domain of a single organization, to third parties, partners and customers and without the need for explicit authentication and authorization. The ledger's data blocks may also provide a mechanism for an immutable audit trail to ensure full regulatory transparency, for example.

Figure 1:
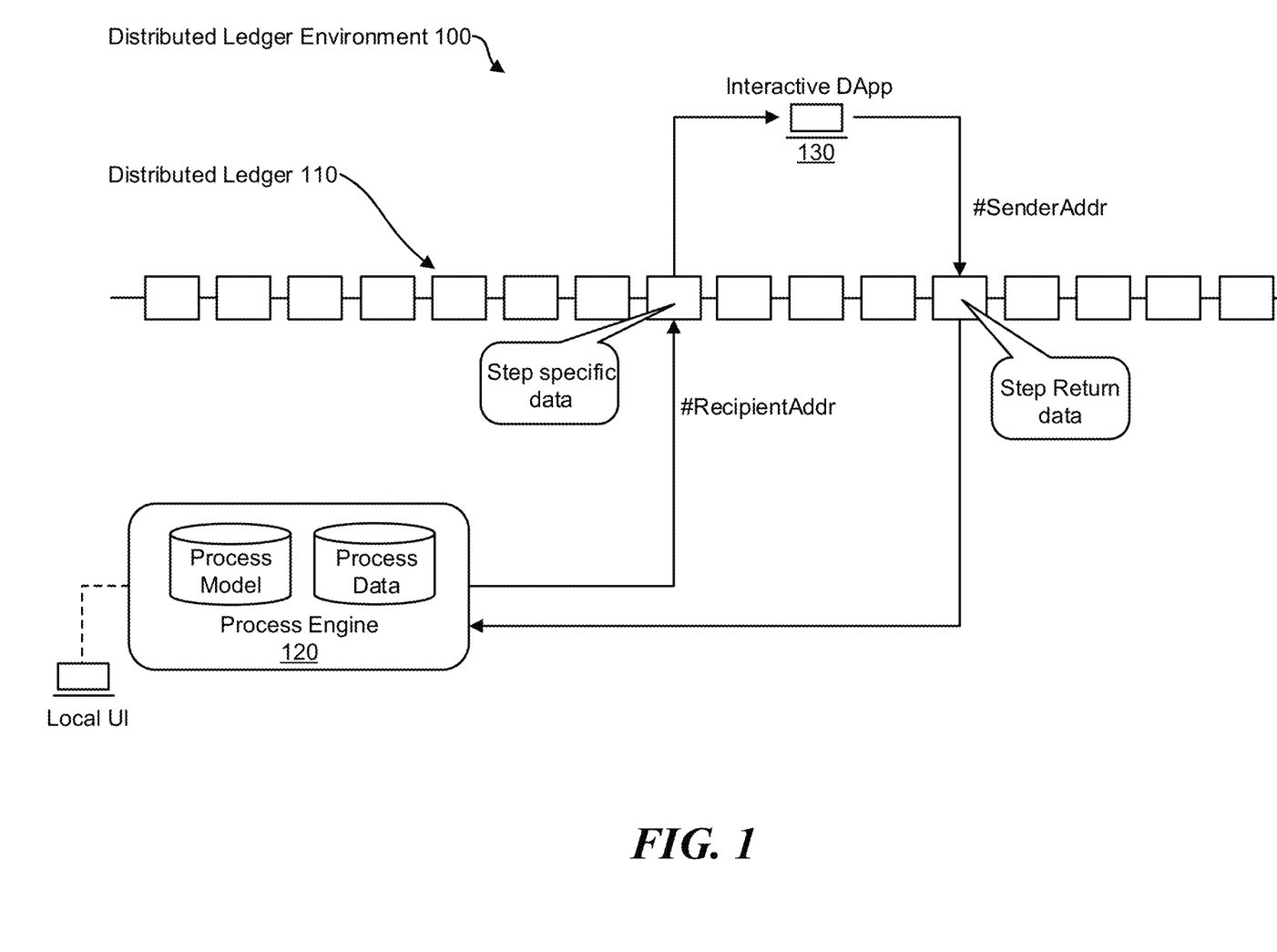
FIG. 1 illustrates an example operating environment in accordance with one or more embodiments, wherein a distributed ledger in communication with a process engine may be utilized to manage workflow among two or more entities.
Figure 2:
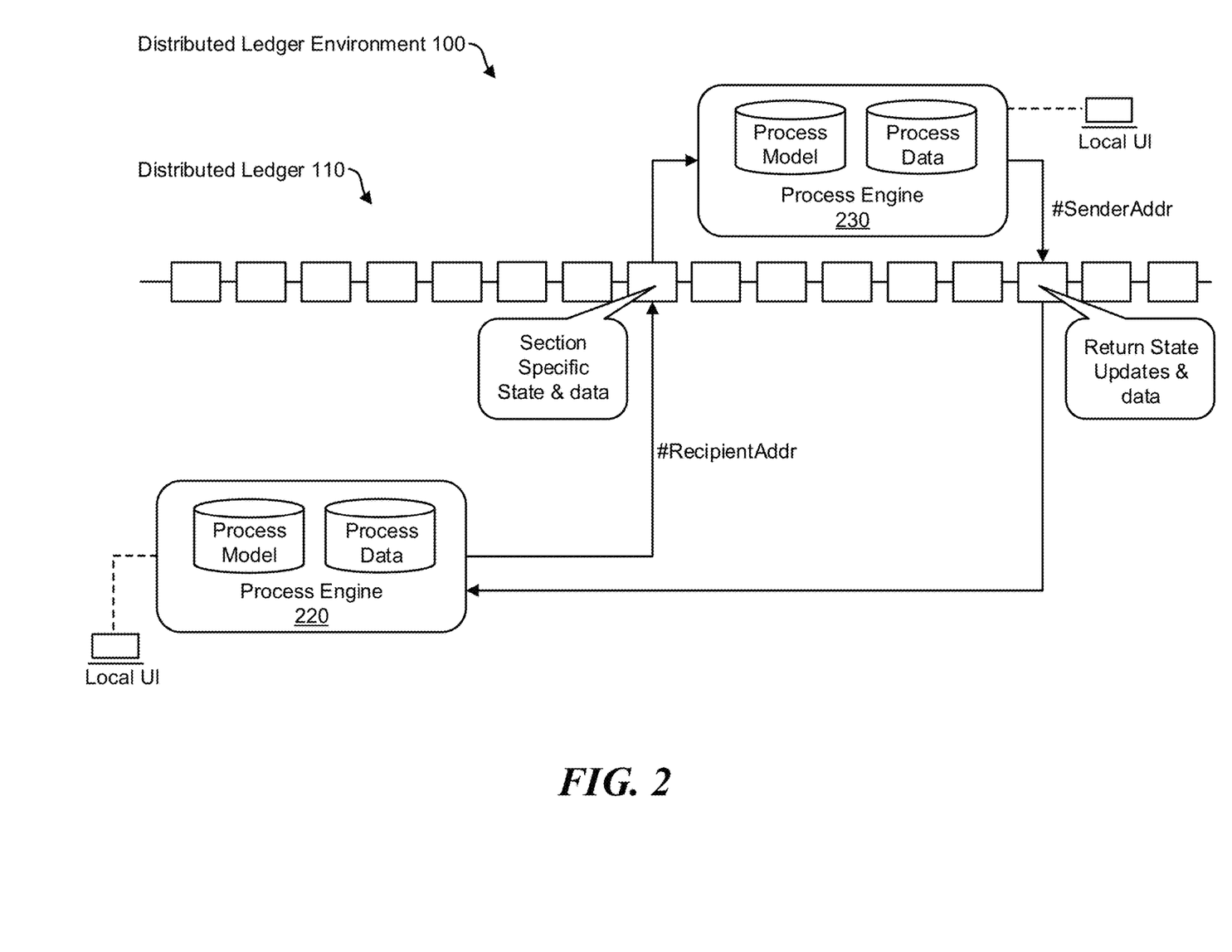
FIG. 2 illustrates an example operating environment in accordance with one or more embodiments, wherein a distributed ledger in communication with multiple process engines may be utilized to manage workflow.
Figure 3:
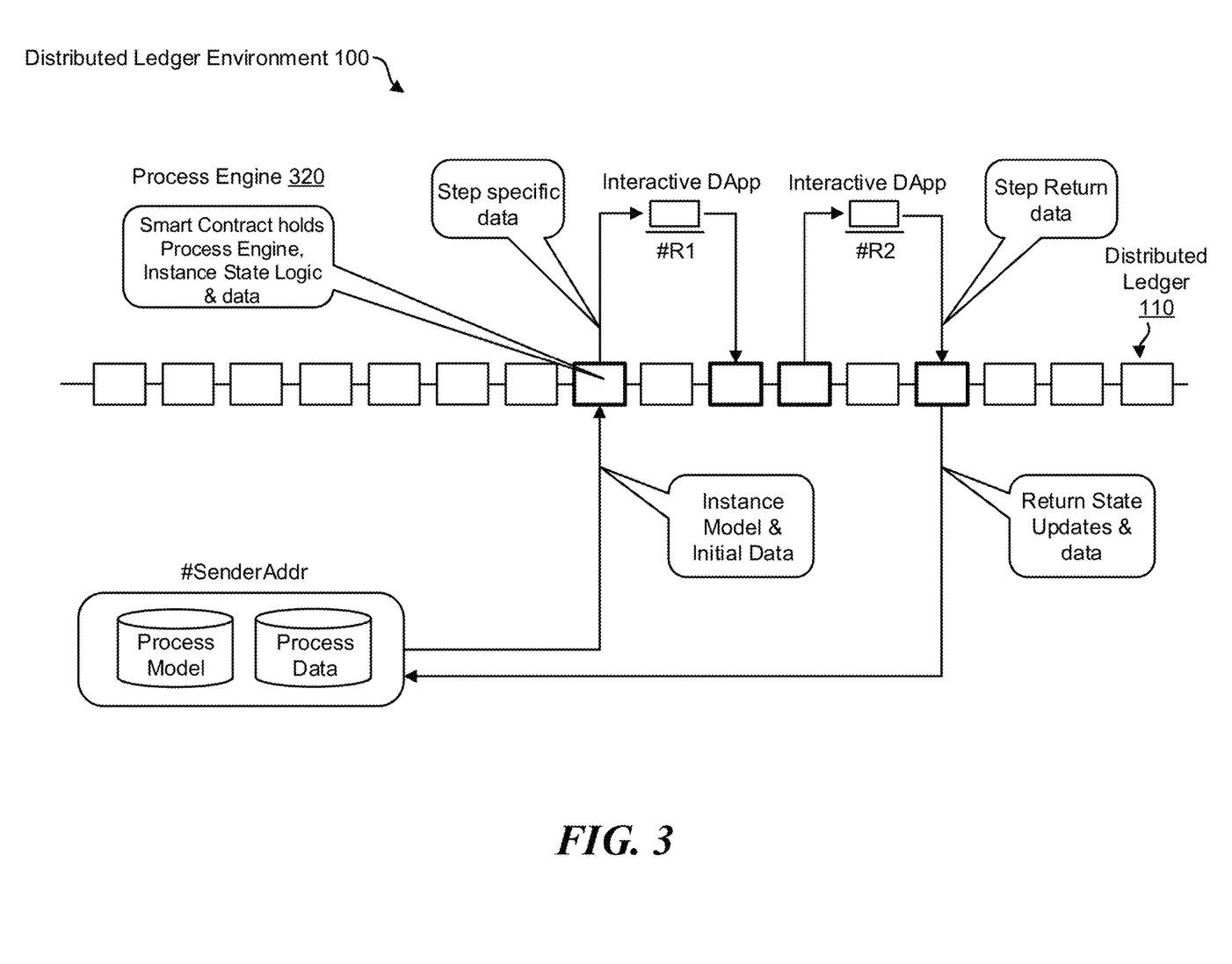
FIG. 3 illustrates an example operating environment in accordance with one or more embodiments, wherein a distributed ledger having smart contract capabilities may be utilized to manage workflow.

Referring to FIGS. 1 through 3, a distributed ledger environment 100 may be implemented as an immutable mechanism for process flow management in which parties involved in managing, for example, a business process may write and read data and instructions associated with one or more processes using a distributed ledger platform. The distributed ledger platform may provide the infrastructure in which the parties that manage a process may communicate by writing to block addresses designated to the parties engaged in the process.

As shown in FIG. 1, a distributed ledger environment 100 may include a distributed ledger 110, having a plurality of linked data blocks. The distributed ledger 110 may be communicatively connected or coupled to a process engine 120 that may include a process model and process data storable or deposited in one or more data storage media. A user may interact with the process engine 120 by way of a user interface mechanism. The process model may define parameters and constraints associated with the manner in which process data is to be utilized or manipulated in order for a process to be performed according to a workflow map or plan of operation.

In the example embodiment of FIG. 1, the process engine 120 may be implemented over a host server (not shown separately) controlled by a first entity (e.g., an organization or individual) that retains control over the process model, the process instance state and the process data. When a distributed interaction is initiated, data relevant to one or more steps in a process or workflow may be posted to the distributed ledger 110 by writing, for example, an encrypted version of the data to one or more blocks on the distributed ledger 110. In some implementations, a distributed application (i.e., DApp) 130 may be operated by a second entity for the purpose of receiving the data deposited on the distributed ledger 110 by the first entity.

The distributed ledger 110 platform may advantageously provide services such as authentication of the entities accessing the data stored in the distributed ledger blocks as well as providing the storage resources for storing the data for the duration needed for the tasks in the process workflow to be performed. The distributed ledger 110 structure, in some embodiments, may provide a host of data security mechanisms (e.g., authentication, encryption, etc.) so the data communicated via the distributed ledger 110 remains confidential and protected. Further, the distributed ledger 110 may provide an immutable record of the process workflow between the entities engaged in managing the process. Such record may be verified by multiple distributed entities associated with the distributed ledger 110 for the purpose of accuracy or reliability and may be traced and audited as needed or necessary.

In one or more aspects, the second entity may utilize resources external to the distributed ledger 110 to perform a requested process and then return related new or updated data to the first entity, via the distributed ledger 110, for example. The first entity may then use the updated data deposited to the distributed ledger 110 and update a database local to the first entity. In some embodiments, the above disclosed technical approach may require the centralized management of the process engine 120, but nevertheless may provide for individual tasks to be executed without compliance with the computational or internal constraints exclusively associated with the first entity.

In accordance with at least one example implementation, the processing may be achieved by the first entity's process engine 120 (or a processing server) replacing a local interface (e.g., a cloud connector) by which the first entity interacts with external services. The processing function may be executed external to the first entity. For example, a step in the process instance may be implemented to call a function inside the cloud connector through an internal messaging queue. The cloud connector function may provide the integration and manage the communication with the distributed ledger 110 APIs. Externally implemented processing functions may be triggered by a local cloud connector and the distributed ledger 110 may act as a message queue, for example, to provide means of communication between the process engine 120 and the external task services provided by the second entity.

As a use case example, an insurance company (i.e., a first entity) may request from an independent agent (i.e., a second entity) to validate an applicant's credentials or status for the purpose of underwriting. In another use case example, a bank or lending entity may ask a university to verify a student's enrolment status for the purpose of processing a loan application. In the above two scenarios, the insurance company or the bank may maintain control over the processing function for approving an applicant internally, but may request a second party to independently obtain the needed background data about an applicant and return the data via the distributed ledger 110. It is noteworthy that data communicated may be encrypted for security purposes and a public/private key infrastructure or authentication mechanisms may be utilized to ensure or enhance data and communication integrity.

In some embodiments, in addition to exchanging data and instructions by way of the distributed ledger 110, a segmented distribution process may be implemented such that the parties involved in managing a process or workflow may also provide additional processing information. The additional processing information may include information about the state of a process and may be stored in the distributed ledger blocks so that a receiving party may be able to manage the process according to the most recent state at which the sending party was engaged in managing the process. In this manner, the distributed ledger 110 platform may be used to synchronize the management of the process between multiple parties involved.

Referring to FIG. 2, distributed ledger environment 100 may be implemented with a distributed ledger 110 that is communicatively coupled to a first entity utilizing a process engine 220 and a second entity utilizing a process engine 230. In one or more aspects, a segment of a process initiated by the process engine 220 may be transferred via the distributed ledger 110 to the second entity to execute one or more steps in the segment by way of the process engine 230.

In accordance with one or more embodiments, the process engines 220 and 230 may be implemented to utilize the same, compatible or matching process models for the purpose of compatibility and to enable the process engines 220 and 230 to seamlessly process data being communicated between the two process engines based on instance and state data tracked for the process. Instance and state data for the process may be communicated through the distributed ledger 110 for one or more discrete segments of the process, for example, such that operational control over different steps or segments may be timely distributed (or synchronized) between the process engines 220 or 230.

In one instance, for example, the process engine 230 may receive a first state associated with the data posted to the distributed ledger 110 and further advance the processing of the data from the first state to a second state until end of an identified processing segment is reached. Once the processing of a target segment is completed, control may be returned along with an updated state to the opposing process engine. In one embodiment, updated data and auditing information may be transferred between the process engine 220 and the process engine 230 via the distributed ledger 110.

It is noteworthy that depending on implementation, more than two process engines may be deployed, such that segment, state or instance data may be shared among the process engines as needed to process discrete process segments as enabled by the distributed ledger environment 100. As such, depending on implementation, the segment processing may be implemented between two or more entities (e.g., organisations) that have process engines with the same process definitions and are configured to exchange control of a segment's process instance, state, and business data over the distributed ledger 110. Depending on implementation or agreement between the entities, the primary auditing rights or the control over the completion of a workflow or process may stay with one of the parties (e.g., the first entity that initiated the processing request).

Accordingly, processes or sub-processes may be delegated or assigned to independently operated partner entities. In an example scenario, an engineering company, contractor or subcontractor may designate an independent design studio to perform the authoring or review process for a new engineering design, as part of a new component manufacturing contract. In another example scenario, an insurance company may want to engage an independent underwriter to investigate and authorize an application for coverage. In yet another example scenario, an insurer may authorize multiple repair companies to complete a complex car repair process or a house flood repair. In all the above scenarios, it would be desirable for the initiating entity (e.g., an engineering company, an insurance company, etc.) to delegate the processing of different tasks to one or more to one or more independent parties without losing control over certain essential requirements.

In some embodiments, the distributed ledger environment 100 is implemented such that the initiating entity may control the contractual functionality of the process workflow by instrumenting the distributed ledger 110 with proper control information. In other words, the initiating entity may implement rules and conditions associated with how the process is managed or how transactions associated with the process or corresponding workflow are verified and possibly monetized. In certain embodiments, the control over process flow, verification of the process steps or monetization may be assigned to a smart contract implemented over the distributed ledger platform, as shown in FIG. 3.

Referring to FIG. 3, in a smart contract implementation, control of the workflow process may be more equitably handled by the distributed ledger infrastructure by way of a smart contract running on the distributed ledger. This implementation obviates the need for process engines 220 and 230 to be managed by the first or second entity and instead incorporates the corresponding functionality into process engine 320, such that control over the process or monetization is not in the hands of either entity or an interested party. In one example implementation, the distributed ledger 110 may act as an independent entity (e.g., an escrow) to provide a decentralized platform, such that when certain rules or conditions indicated in the smart contract are satisfied, the distributed ledger 110 manages or moves the process flow to the next step.

In one example embodiment, the process engine 320 may be encapsulated or incorporated in the form of a smart contract supported by a virtual machine provided by the distributed ledger 110. The process model, state and process data may be stored on the distributed ledger 110, such that state transitions, as well as logical decisions may be handled by the smart contract, or a series of smart contracts. Accordingly, process data and audit information may be held immutably (e.g., may indefinitely persist) on the distributed ledger 110 and may be queried by the initiating or participating parties for progress status or other process-related information.

Figure 4:
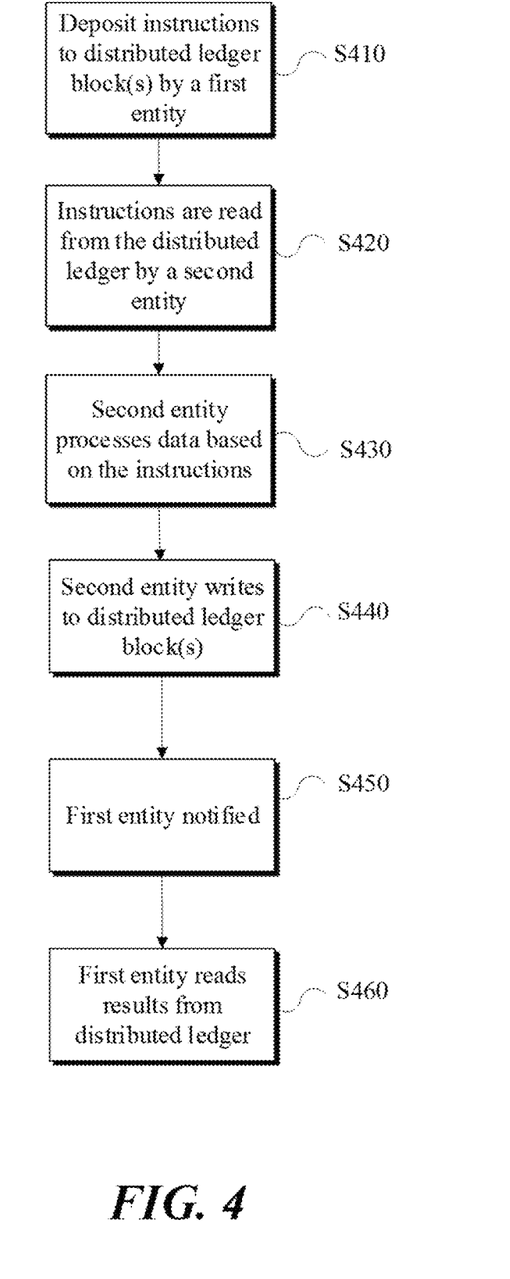
FIG. 4 is an example flow diagram of a method of managing workflow between multiple entities, in accordance with one or more implementations, using a distributed ledger environment or platform.

Referring to FIG. 4, the overall processing in respect to example embodiments illustrated in FIGS. 1 through 3 may be summarized as follows. Depending on implementation, in at least one example embodiment, when a first entity desires to request from a second entity to perform a certain process (e.g., based on instructions and data provided by the first entity), the first entity may write or deposit the instructions or the corresponding data to one or more blocks in a distributed ledger block addressed to the second entity (S410).

It is noteworthy that the data written or read from the distributed ledger blocks by the parties may include, without limitation, raw information that is to be processed or metadata providing information about at least one or more of the processing state, data instances, synchronization data, audit data, payment-related data, and any other information that may be utilized by the parties to advance the processing of the raw data or control process flow, data access or payment. Furthermore, the information written to the distributed ledger block may be encrypted using a private key of the first entity for the purpose of data security and confidentiality.

Referring back to FIG. 4, the second entity may be notified of the availability of the information written to the distributed ledger block addressed to the second entity and read the information, optionally, after the second entity has been properly authenticated by the distributed ledger 110 infrastructure (S420). If the information is encrypted, having access to the public key of the first entity, the second entity may decrypt the information read from the distributed ledger block by the first entity. The second entity may then perform the requested process on the provided data according to the first entity's instructions read from the distributed ledger block (S430).

When the second entity has completed the processing, the second entity may notify the first entity by writing to one or more blocks on the distributed ledger 110 associated with the first entity (S440). The information written to the distributed ledger 110 by the second entity may include results of the processing performed by the second entity or notifications or verifications that the processing is complete. When the first entity receives a notification of completion (S450), the first entity reads the results from one or more ledger blocks associated with the first entity (S460). In certain implementations, where a smart contract infrastructure is deployed over the distributed ledger 110, upon receiving an indication or verification of completion by a first entity (e.g., a requesting entity), a second entity (e.g., a service provider) is paid automatically without the need for submitting, reviewing, or authorizing the payment of invoices, for example.

Advantageously, using the disclosed implementations above, process management may be extended beyond the organisation's boundaries, without the need for access to a single centralized authority for credentialing the authorized entities. Further, improvements in process control may be achieved by sharing the responsibility for processing one or more process segments among a plurality of dependent or independent entities or participants in a transparent manner, where needed or desired.

Moreover, processes may be configured to span any length of time without the need of occupying live servers. Examples of such processes may include, but is are not limited to, processes that span life events such as pension or life insurance management plans. Accordingly, a smart contract on a distributed ledger 110 may be implemented and left to run for long periods of time because the corresponding data, constraints and processing instructions may be safely, transparently and permanently be stored on the distributed ledger environment 100 disclosed herein without the possibility or fear of loss or manipulation by unscrupulous parties or individuals.

Figure 5:
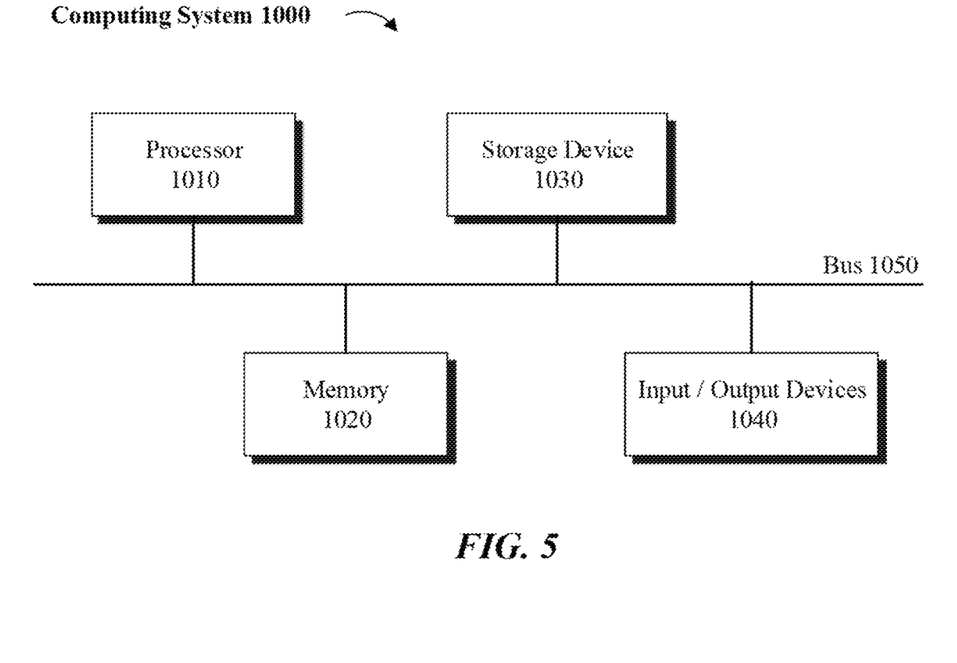
FIG. 5 is a block diagram of a computing system 1000 that may be utilized to perform one or more computer processes disclosed herein as consistent with one or more embodiments.

Referring to FIG. 5, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 5, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent end-points or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented method in a communications network comprising a first process engine, a second process engine, and a distributed immutable ledger in communication with the first process engine and the second process engine over the communications network to manage a workflow in interactive computer software applications, the method comprising:

depositing, by a first party using the first process engine, at least one instruction onto one or more data blocks of the distributed immutable ledger implemented to have a plurality of data blocks connected by way of logical links in a sequential chain, wherein a first block of the one or more data blocks is monitored by a second party, the at least one instruction being associated with information deposited onto the one or more data blocks, the deposited information comprising at least one of data or metadata utilizable by the second party in the interactive computer software applications, wherein the at least one of data or metadata identifies a state of one or more processes associated with the deposited information to enable the first party and the second party to determine progress in workflow associated with the one or more processes, wherein the at least one of data or metadata enables the first party and the second party to utilize the distributed immutable ledger as a distributed environment in which the workflow is manageable between two or more parties according to state information communicated between the two or more parties, wherein the at least one of data or metadata enables the first party and the second party to synchronize the workflow associated with the one or more processes, wherein the interactive computer software application includes at least one of a spreadsheet or word processing functionality;

using a computing application which is one of the interactive computer software applications and the second process engine to perform one or more operations according to the at least one instruction as related to a first step in a process being managed by the first party;

utilizing, by the first party and the second party, the at least one of data or metadata for workflow synchronization and to determine workflow progress of the one or more processes associated with the deposited information, wherein one or more of the first process engine and second process engine defines constraints in how the deposited information can be utilized or manipulated in order for a process to be performed according to a map of the workflow;

reading one or more results deposited onto one or more blocks of the distributed immutable ledger, the one or more results having been generated by the second party according to the at least one instruction deposited by the first party;

utilizing, by the first party, at least a portion of the one or more results deposited by the second party to confirm that the one or more processes associated with the deposited information are performed by the second party according to the at least one instruction, the one or more results deposited by the second party being stored on a second block on the distributed immutable ledger, wherein the first party monitors the second block, wherein the first process engine is encapsulated or incorporated as a smart contract on the distributed immutable ledger;

synchronizing state information by a third process engine via updating the at least one of data or metadata based on information provided to a third party by at least one of the first party or the second party; and determining workflow progress by utilizing the third process engine, independent of the first process engine and the second process engine, a smart contract to control transactions and workflow associated with the one or more processes in accordance with the synchronized state information for the one or more processes, the state information being identified in the at least one of data or metadata to indicate a most recent state at which either the first party or the second party is engaged in managing the process in the workflow, wherein rules and conditions associated with managing the one or more processes or controlling the transactions and the workflow are stored on at least one block of the distributed immutable ledger, wherein the second process engine is compatible with the first process engine to:

monitor a first data block of the distributed immutable ledger for the at least one instruction;

perform the one or more operations according to the at least one instruction in order to advance the process being managed by the first party to a second step in the process;

deposit the one or more results on a second data block monitored by the first process engine; and deploy one or more of the first process engine and the second process engine on the distributed immutable ledger to orchestrate an execution of process flow and data exchanges between the first party and the second party.

2. The method of claim 1, wherein the first party implements the distributed immutable ledger with control information.

3. The method of claim 2, wherein the control information are implementations of rules and conditions.

4. The method of claim 1, wherein one or more records are maintained on the distributed immutable ledger, the one or more records comprising: the at least one instruction, the deposited information by the first party, and the deposited results by the second party.

5. The method of claim 1 comprising utilizing the first process engine by the first party,
wherein one or more records are maintained on the distributed immutable ledger, the one or more records comprising: the at least one instruction, the deposited information by the first party, and the deposited results by the second party,
wherein the deposited information by the first party are stored on a first data block on the distributed immutable ledger by the first process engine, the first data block being monitored by the second party, and
wherein the one or more results deposited by the second party are stored on a second data block on the distributed immutable ledger, the second data block being monitored by the first process engine.

6. The method of claim 1, wherein the at least one of data or metadata is metadata.

7. The method of claim 1, wherein the at least one of data or metadata is data.

8. A computer-implemented system to manage a workflow in interactive computer software applications comprising:
at least one programmable processor;
a distributed immutable ledger; and
a non-transitory machine-readable medium storing instructions that, when executed by the at least one programmable processor, cause the at least one programmable processor to perform operations comprising:
depositing, by a first party using a first process engine, at least one instruction onto one or more data blocks of the distributed immutable ledger implemented to have a plurality of data blocks connected by way of logical links in a sequential chain, wherein a first block of the one or more data blocks is monitored by a second party,
the at least one instruction being associated with information deposited onto the one or more data blocks, the deposited information comprising at least one of data or metadata utilizable by the second party in the interactive computer software application, wherein the at least one of data or metadata identifies a state of one or more processes associated with the deposited information to enable the first party and the second party to determine progress in workflow associated with the one or more processes, wherein the at least one of data or metadata enables the first party and the second party to utilize the distributed immutable ledger as a distributed environment in which the workflow is manageable between two or more parties according to state information communicated between the two or more parties, wherein the at least one of data or metadata enables the first party and the second party to synchronize the workflow associated with the one or more processes,
wherein the interactive computer software application includes at least one of a spreadsheet or word processing functionality;
using a computing application which is one of the interactive computer software applications and a second process engine to perform one or more operations according to the at least one instructions as related to a first step in a process being managed by the first party;
utilizing, by the first party and the second party, the at least one of data or metadata for workflow synchronization and to determine workflow progress of the one or more processes associated with the deposited information, wherein the first process engine defines constraints in how the deposited information can be utilized or manipulated in order for a process to be performed according to a map of the workflow;
reading one or more results deposited onto one or more blocks of the distributed immutable ledger, the one or more results having been generated by the second party according to the at least one instruction deposited by the first party;
utilizing at least a portion of the one or more results deposited by the second party to confirm that one or more processes associated with the deposited information are performed by the second party according to the at least one instruction, the one or more results deposited by the second party being stored on a second block on the distributed immutable ledger, wherein the first party monitors the second block,
wherein one or more of the first process engine and second process engine is encapsulated or incorporated as a smart contract on the distributed immutable ledger;
synchronizing state information by a third process engine via updating the at least one of data or metadata based on information provided to a third party by at least one of the first party or the second party; and
determining workflow progress by utilizing the third process engine, independent of the first process engine and the second process engine, a smart contract to control transactions or workflow associated with the one or more processes in accordance with the synchronized state information for the one or more processes, the state information being identified in the at least one of data or metadata to indicate a most recent state at which either the first party or the second party is engaged in managing the process in the workflow synchronized by the third process engine,
wherein rules and conditions associated with managing the one or more processes or controlling the transactions and the workflow are stored on at least one block of the distributed immutable ledger,
wherein the second process engine is compatible with the first process engine to:
monitor a first data block of the distributed immutable ledger for the at least one instruction;
perform the one or more operations according to the at least one instruction in order to advance the process being managed by the first party to a second step in the process;
deposit the one or more results on a second data block monitored by the first process engine; and
deploy one or more of the first process engine and the second process engine on the distributed immutable ledger to orchestrate an execution of process flow and data exchanges between the first party and the second party.

9. The system of claim 8, wherein the first party implements the distributed immutable ledger with control information.

10. The system of claim 9, wherein the control information are implementations of rules and conditions.

11. The system of claim 8, wherein one or more records are maintained on the distributed immutable ledger, the one or more records comprising: the at least one instruction, the deposited information by the first party, and the deposited results by the second party.

12. The system of claim 8, wherein the at least one of data or metadata is metadata.

13. The system of claim 8, wherein the at least one of data or metadata is data.

14. A computer program product to manage a workflow in interactive computer software applications comprising a non-transitory machine-readable medium storing instructions that, when executed by at least one programmable processor, cause the at least one programmable processor to perform operations comprising:

depositing, by a first party using a first process engine, at least one instruction onto one or more data blocks of a distributed immutable ledger implemented to have a plurality of data blocks connected by way of logical links in a sequential chain, wherein a first block of the one or more data blocks is monitored by a second party, the at least one instruction being associated with information deposited onto the one or more data blocks, the deposited information comprising at least one of data or metadata utilizable by the second party in the interactive computer software applications, wherein the at least one of data or metadata identified a state of one or more processes associated with the deposited information to enable the first party and the second party to determine progress in workflow associated with the one or more processes, wherein the at least one of data or metadata enables the first party and the second party to utilize the distributed immutable ledger as a distributed environment in which the workflow is manageable between two or more parties according to state information communicated between the two or more parties, wherein the at least one of data or metadata enables the first party and the second party to synchronize the workflow associated with the one or more processes, wherein the interactive computer software application includes at least one of a spreadsheet or word processing functionality;

using a computing application which is one of the interactive computer software applications and a second process engine, to perform one or more operations according to the at least one instructions as related to a first step in a process being managed by the first party, wherein the first process engine defines constraints in how the deposited information can be utilized or manipulated in order for a process to be performed according to a map of the workflow;

reading one or more results deposited onto one or more blocks of the distributed immutable ledger, the one or more results having been generated by the second party according to the at least one instruction deposited by the first party; and utilizing at least a portion of the one or more results deposited by the second party to confirm that the one or more processes associated with the deposited information are performed by the second party according to the at least one instruction, the one or more results deposited by the second party being stored on a second block on the distributed immutable ledger, wherein the first party monitors the second block, wherein one or more of the first process engine and second process engine is encapsulated or incorporated as a smart contract on the distributed immutable ledger;

synchronizing state information by a third process engine via updating the at least one of data or metadata based on information provided to a third party by at least one of the first party or the second party; and determining workflow progress by utilizing the third process engine being incorporated in form of a smart contract to, independent of the first process engine and the second process engine, control transactions or workflow associated with the one or more processes in accordance with the synchronized state information for the one or more processes, the state information being identified in the at least one of data or metadata to indicate a most recent state at which either the first party or the second party is engaged in managing the process in the workflow synchronized by the third process engine, wherein rules and conditions associated with managing the one or more processes or controlling the transactions and the workflow are stored on at least one block of the distributed immutable ledger, wherein the second process engine is compatible with the first process engine to:

monitor a first data block of the distributed immutable ledger for the at least one instruction;

perform the one or more operations according to the at least one instruction in order to advance the process being managed by the first party to a second step in the process;

deposit the one or more results on a second data block monitored by the first process engine; and deploy one or more of the first process engine and the second process engine on the distributed immutable ledger to orchestrate an execution of process flow and data exchanges between the first party and the second party.

15. The computer program product of claim 14, wherein the first party implements the distributed immutable ledger with control information.

16. The computer program product of claim 15, wherein the control information are implementations of rules and conditions.

17. The computer program product of claim 14, wherein one or more records are maintained on the distributed immutable ledger, the one or more records comprising: the at least one instruction, the deposited information by the first party, and the deposited results by the second party.

18. The computer program product of claim 14, wherein the deposited information by the first party are stored on a first block on the distributed immutable ledger, the first block being monitored by the second party, the first party implementing rules or conditions associated with how the process is managed or how transactions associated with the process or corresponding workflow are verified.

19. The computer program product of claim 14, wherein the at least one of data or metadata is metadata.

20. The computer program product of claim 14, wherein the at least one of data or metadata is data.

* * * * *